United States Patent
Butler et al.

[15] 3,681,342
[45] Aug. 1, 1972

[54] ESTERS OF - CARBOXYBENZYLPENICILLIN

[72] Inventors: Kenneth Butler, Old Lyme; Ernest Seiichi Hamanaka, Groton, both of Conn.

[73] Assignee: Pfizer Inc., New York, N.Y.

[22] Filed: Nov. 12, 1970

[21] Appl. No.: 89,137

Related U.S. Application Data

[63] Continuation-in-part of Ser. No. 880,395, Nov. 26, 1969, abandoned.

[52] U.S. Cl..............................260/239.1, 424/271
[51] Int. Cl................................................C07d 99/16
[58] Field of Search..................................260/239.1

[56] References Cited

UNITED STATES PATENTS

| | | | |
|---|---|---|---|
| 3,282,926 | 11/1966 | Brain et al. | 260/239.1 |
| 3,557,090 | 1/1971 | Butler | 260/239.1 |
| 3,557,094 | 1/1971 | Butler | 260/239.1 |

FOREIGN PATENTS OR APPLICATIONS

1,138,745  1/1969  Great Britain.............260/239.1

*Primary Examiner*—Nicholas S. Rizzo
*Attorney*—Connolly & Hutz

[57] ABSTRACT

Mono- and diesters of α-carboxybenzylpenicillin, a novel class of chemotherapeutic agents.

11 Claims, No Drawings

ESTERS OF -CARBOXYBENZYLPENICILLIN

CROSS REFERENCE TO RELATED APPLICATIONS

This application is a continuation-in-part of copending application, Ser. No. 880,395, filed Nov. 26, 1969 and now abandoned.

BACKGROUND OF THE INVENTION

This invention relates to a series of novel mono- and diesters of $\alpha$-carboxybenzylpenicillin which have, surprisingly, high antibacterial action following oral administration.

Efforts to enhance the oral efficacy of $\alpha$-carboxybenzylpenicillin have resulted in the preparation of a variety of ester derivatives. Netherlands Specification No. 69,00135, published June 8, 1969 describes a number of monoaryl $\alpha$-carboxybenzylpenicillin esters. British Pat. No. 1,138,745, granted Jan. 1, 1969 discloses diesters of $\alpha$-carboxybenzylpenicillin, including the bis(acetoxymethyl)ester.

SUMMARY OF THE INVENTION

The novel antibacterial $\alpha$-carboxybenzylpenicillin mono- and diesters of this invention are represented by the formulas:

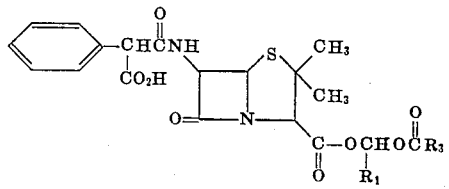

I

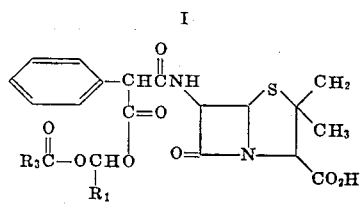

II and the pharmaceutically acceptable salts thereof, where:

$R_1$ is selected from the group consisting of:
1. hydrogen,
2. alkyl, alkoxyalkyl and alkylthioalkyl each containing up to six carbon atoms,
3. cycloalkyl of from three to six carbon atoms and
4. phenylalkyl and mono- and disubstituted phenylalkyl wherein said substituent is selected from the group consisting of alkyl containing up to three carbon atoms, chlorine, bromine, fluorine and alkoxy and alkylthio each containing up to two carbon atoms and said alkyl contains from one to three carbon atoms; and $R_3$ is selected from the group consisting of:
1. alkyl of up to six carbon atoms,
2. cycloalkyl of from three to eight carbon atoms,
3. phenyl, phenylalkyl and mono- and disubstituted phenyl and phenylalkyl wherein said alkyl portion consists of one to three carbon atoms and said substituents are each chosen from the group consisting of chlorine, bromine, fluorine, alkoxy and alkylthio each having up to two carbon atoms, alkanoylamino and alkyl each containing up to three carbon atoms, trifluoromethyl and N,N-di-(n-propyl)-sulfamyl,
4. phenylheteroalkyl and substituted phenylheteroalkyl of the formula:

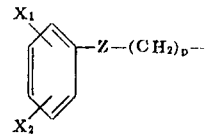

wherein the substituents, $X_1$ and $X_2$, are each chosen from the group consisting of hydrogen, chlorine, bromine, fluorine, alkyl containing up to three carbon atoms and alkoxy and alkylthio each having up to two carbon atoms, Z is selected from the group consisting of O and S and $p$ is an integer of from 1 to 3;

and

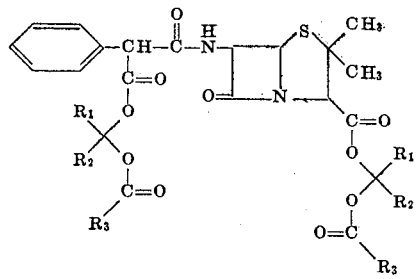

III where $R_1$ and $R_2$ when considered separately are each selected from the group consisting of:
1. hydrogen provided that when one of said $R_1$ and $R_2$ substituents is hydrogen, the other is a member selected from the group consisting of alkyl, alkoxyalkyl and alkylthioalkyl each containing up to six carbon atoms, cycloalkyl of from three to six carbon atoms, phenylalkyl and mono- and disubstituted phenylalkyl wherein said substituent is selected from the group consisting of alkyl containing up to three carbon atoms, chlorine, bromine, fluorine and alkoxy and alkylthio each containing up to two carbon atoms and said alkyl contains from one to three carbon atoms,
2. alkyl, alkoxyalkyl and alkylthioalkyl each containing up to six carbon atoms,
3. cycloalkyl of from three to six carbon atoms,
4. phenylalkyl and mono- and disubstituted phenylalkyl wherein said substituent is selected from the group consisting of alkyl containing up to three carbon atoms, chlorine, bromine, fluorine and alkoxy and alkylthio each containing up to two carbon atoms and said alkyl contains from one to three carbon atoms;

$R_1$ and $R_2$ when taken together with the carbon atom to which they are attached form a ring system of the formula:

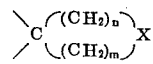

wherein X is selected from the group consisting of $CH_2$, O and S, and $n$ and $m$ are each integers of from 1 to 3; and $R_3$ is selected from the group consisting of:
1. alkyl of up to six carbon atoms,
2. cycloalkyl of from three to eight carbon atoms,
3. phenyl, phenylalkyl and mono- and disubstituted phenyl and phenylalkyl wherein said alkyl portion consists of one to three carbon atoms and said substituents are each chosen from the group consisting of chlorine, bromine, fluorine, alkoxy and alkylthio each having up to two carbon atoms, alkanoylamino and alkyl each containing up to three carbon atoms, trifluoromethyl and N,N-di-(n-propyl)-sulfamyl,
4. phenylheteroalkyl and substituted phenylheteroalkyl of the formula:

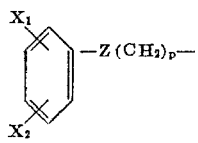

wherein the substituents, $X_1$ and $X_2$, are each chosen from the group consisting of hydrogen, chlorine, bromine, fluorine, alkyl containing up to three carbon atoms and alkoxy and alkylthio each having up to two carbon atoms, Z is selected from the group consisting of O and S and $p$ is an integer of from 1 to 3.

Of particular interest, because of their antibacterial activity, are monoesters of Formulas I and II wherein $R_1$ is hydrogen or methyl and $R_3$ is alkyl containing up to six carbon atoms and diesters of Formula III wherein $R_1$ is hydrogen or methyl and $R_2$ is selected from the group consisting of alkyl of up to six carbon atoms; $R_1$ and $R_2$ when taken together with the carbon atom to which they are attached form a ring of the formula:

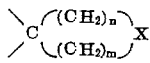

wherein X is $CH_2$, $n$ is 1, and $m$ is an integer from 1 to 3; $R_3$ is selected from the group consisting of alkyl of up to six carbon atoms; cycloalkyl of from three to eight carbon atoms; phenyl, phenylalkyl and mono- and disubstituted phenyl and phenylalkyl wherein said alkyl portion consists of one to three carbon atoms and said substituents are each chosen from the group consisting of chlorine, fluorine, bromine, alkoxy and alkythio each having up to two carbon atoms, alkanoylamino and alkyl each containing up to three carbon atoms, trifluoromethyl and N,N-di-(n-propyl)-sulfamyl; and phenylheteroalkyl and substituted phenylheteroalkyl of the formula:

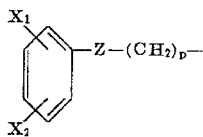

wherein the substituents, $X_1$ and $X_2$, are each chosen from the group consisting of hydrogen, chlorine, bromine, fluorine, alkyl containing up to three carbon atoms and alkoxy and alkylthio each having up to two carbon atoms, Z is selected from the group consisting of O and S and $p$ is an integer of from 1 to 3.

DETAILED DESCRIPTION OF THE INVENTION

In accordance with the process employed for the preparation of the novel monoesters of this invention an $\alpha$-carboxybenzylpenicillin disalt of the formula:

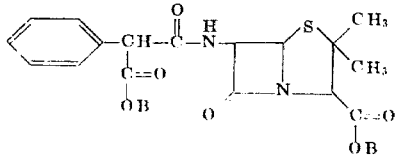

is contacted with an $\alpha$-acyloxyalkyl halide of the formula $R_3CO_2CHR_1$—Hal wherein $R_1$ and $R_3$ are as previously defined, B is sodium, potassium, lithium or a tertiary(lower)alkyl amine and Hal represents a halogen, i.e., chlorine or bromine.

The aforesaid reaction is normally conducted in a reaction-inert solvent such as tetrahydrofuran, dimethylformamide, dimethylsulfoxide or hexamethylphosphoramide. In practice, the $\alpha$-acyloxyalkyl halide is added, preferably dropwise, to a solution or suspension of the salts of the diacid, $\alpha$-carboxybenzylpenicillin. One mole of the $\alpha$-acyloxyalkyl halide is added per mole of penicillin, but in certain cases it may be advantageous to employ as much as a 10–20 percent excess. The reaction may be carried out at temperatures of from 0°–50° C. Reaction time will vary according to concentration, the temperature employed and the reactivity of the appropriate starting materials. Normally, the reaction period will range anywhere from one to twenty hours.

Upon completion, the desired product is isolated by such standard means as first diluting with a water immiscible solvent such as ethyl acetate followed by treatment with water or an aqueous bicarbonate solution. The aqueous phase is extracted several times with the water immiscible solvent followed by the acidification of the aqueous solution to pH 4 and extraction of the product with such solvents as ethyl acetate, benzene or methylene chloride.

In many of the preparations wherein a solid, often crystalline material, separates from the extraction solvent, the solid appears to consist predominantly of one of the two possible positional isomers, i.e., ester of the 3- or $\alpha$-carboxy group. Said isomer can be purified by repeated recrystallization from a suitable solvent to a constant melting point. The other isomer, the one present in smaller amounts in the originally isolated solid material, is the predominant product in the mother liquor. It can be recovered therefrom by methods known to those skilled in the art, as for example, the evaporation of the mother liquor and repeated crystallization of the residue to a product of constant melting point.

Mixtures of products which are oils preclude the use of recrystallization to separate the desired isomers. In said instances, the isomers can be separated by column chromatography using acid washed Florisil.

Alternately, the difference in the acidity of the two monoesters allows the separation of said mixture by extraction of the more acidic monoester from a water immiscible solvent into an aqueous basic buffer. In practice, the mixture of monoesters in a solvent such as methylene chloride or benzene is contacted initially with an aqueous buffer of pH 7.5, the buffer separated and thin-layer-chromatography determination carried out on the separated buffer layer. Successively more basic buffers are employed until an optimum pH is determined for that particular monoester. Experimentally, the buffer containing the more acidic monoester is acidified to pH 4 and extracted with a water immiscible solvent such as ethyl acetate. The organic layer is then dried over a suitable drying agent and concentrated in vacuo or the product can be converted directly into an appropriate salt, using a base such as N-ethylpiperidine.

Although said mixtures may be separated by methods known to those skilled in the art, for practical reasons it is advantageous to use said mixtures as they are isolated from the reaction since both monoesters of $\alpha$-carboxybenzylpenicillin exhibit the same type of activity, e.g., antibacterial activity.

Since the isolation of monoesters of Formula I, prepared by the above described procedure, requires the separation from the isomer of Formula II, said procedure, for reasons of economy and convenience, is not the preferred route to these agents.

Several alternate, unequivocal synthetic schemes are employed. Those for the preparation of monoesters of Formula I are as follows:

Scheme A

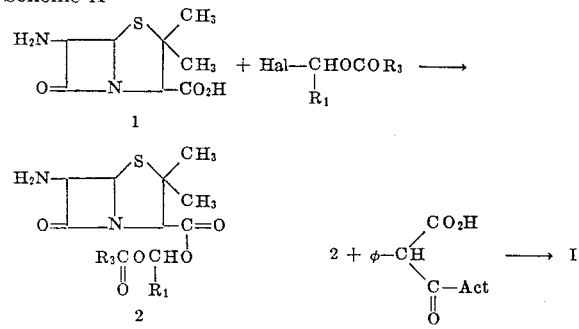

Alkylation of the commercially available 6-aminopenicillanic acid (1) with an $\alpha$-acyloxyalkyl halide,

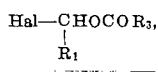

wherein $R_1$, $R_3$ and Hal are as previously described, is carried out in an aprotic, reaction inert solvent such as dimethylformamide or acetone in the presence of a tertiary(lower)-alkylamine such as triethylamine.

In practice, a suspension of 6-APA in the solvent at room temperature and under nitrogen is contacted with at least an equimolar amount of the tertiary amine, and as much as a 50 percent excess, and the mixture allowed to stir for 30–60 minutes. The $\alpha$-acyloxyalkyl halide is added rapidly and the mixture allowed to stir, again at room temperature, for 4–12 hours. A water immiscible solvent such as ethyl acetate is added to the cloud-point and the tertiary amine·H·Hal filtered. The mixture is then treated with water, the organic layer separated and dried and finally, reduced in volume.

The ester of 6-APA (2) is best stored for further use as a salt, preferably the p-toluenesulfonic acid salt, prepared by treating the concentrated ethyl acetate organic layer with a solution containing an equimolar amount of p-toluenesulfonic acid in the same solvent.

The ester (2) is converted to the desired product, I, by acylation with an activated form of phenylmalonic acid, $\phi$CH(CO$_2$H)CO—Act, wherein —Act represents a chloride, anhydride, or p-nitrophenyl ester. The preferred activated form, for reasons of economy and ease of preparation is the mono acid chloride.

Said reaction is best effected in a heterogenous solvent system employing water and a water immiscible, inert solvent such as isopropyl ether or benzene. In practice, a suspension of one mole of the 6-APA ester (2) suspended in the solvent mixture, and cooled in an ice bath, is treated with one mole of the acid chloride of phenylmalonic acid, while a saturated solution of sodium bicarbonate is added simultaneously at such a rate to maintain the pH at 5.5–6.5. After the addition, which requires 15–20 minutes, the reaction mixture is allowed to stir at ice bath temperatures for an additional 15–20 minutes and then at room temperature for 2–4 hours. The pH is adjusted to 5.5 and the organic layer separated, dried over sodium sulfate and concentrated in vacuo to dryness. The crude product is dissolved in diethyl ether and treated with an equimolar amount of sodium 2-ethylhexanoate dissolved in acetone, followed by filtration of the precipitated sodium salt of I.

The second scheme, Scheme B, is as follows:

Scheme B

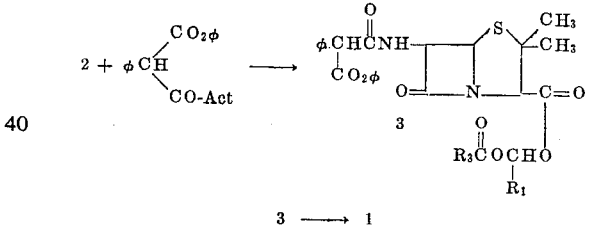

The aforedescribed scheme is a modification of scheme A and employs the use of an activated phenylmalonic acid ester. The preferred activated form of said ester is, again, the acid chloride.

Condensation of 2 with the acid chloride is effected in a similar manner employed in scheme A with respect to ratio of starting materials, solvent, temperature and times. On completion of the reaction, however, the pH is adjusted to 7 and the organic layer separated and dried over sodium sulfate, followed by removal of the solvent under reduced pressure.

Removal of the protecting phenyl group from the $\alpha$-carboxy group of 3 is effected by basic hydrolysis at pH 9.

Experimentally, a solution or partial suspension of 3 in a suitable inert solvent such as tetrahydrofuran, acetone or dimethylformamide is treated with a borate buffer providing a pH of 9–9.5. When the hydrolysis is complete, the reaction mixture is treated with a water immiscible solvent such as di-ethyl ether and the pH of the aqueous layer adjusted to 5–5.5. The organic layer is separated and concentrated under reduced pressure to dryness or, alternately, can be treated with an acetone or ethyl acetate solution of N-ethylpiperidine or sodium 2-ethylhexanoate and the corresponding, resulting salt filtered.

The third scheme, Scheme C, leading to the products of the instant invention comprises the following route to the compounds of Formula I;

Scheme C

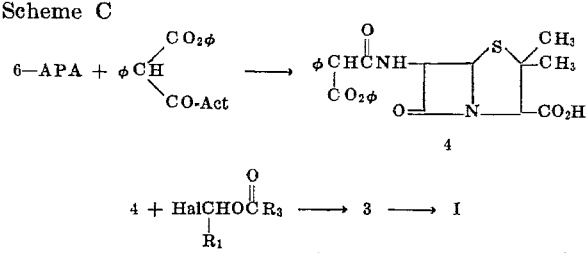

Acylation of 6-APA (1) with the monophenyl ester of an activated phenylmalonic acid such as the acid chloride results in the formation of the phenyl ester of α-carboxybenzylpenicillin (4), and is taught in British Pat. No. 1.004,670 and South African Pat. No. 67/6472. Although the phenyl ester of phenylmalonic acid is the preferred species for both the aforedescribed scheme B and scheme C, any aryl ester can be employed with comparable results.

Alkylation of 4 with the requisite α-acyloxyalkyl halide leading to 3 is effected in a reaction-inert solvent such as dimethylformamide, benzene or dimethylsulfoxide. The salt of 4 can be generated insitu employing a base, e.g., sodium hydride, sodium methoxide or a tertiary(lower)aklyl amine such as triethyl amine. Alternately, the salt can be prepared by methods known to those skilled in the art and isolated prior to use in said reaction.

In general, one mole of salt is reacted with at least one mole of halide with as must as a 50 percent excess. Ambient reaction temperatures are employed, with reaction periods of 2-24 hours. Isolation of the desired product, 3, is conveniently carried out by hydrolysis of the reaction mixture followed by extraction with a water immiscible solvent such as methylene chloride, benzene or ethyl acetate. The organic solvent is separated, dried and removed in vacuo to provide the desired product.

Hydrolysis of the phenyl or aryl esters of the compound 3 leading to the products of the present invention of formula I is carried out using, preferably, a borate buffer of pH 9–9.5 as previously discussed for scheme B.

The appropriate starting reagents employed for the synthesis of monoesters of formula I in schemes A, B and C are either commercial chemicals or can be prepared readily by those skilled in the art. Disodium α-carboxybenzylpenicillin is commercially available, while procedures for the preparation of the free diacid and other salts are described in U.S. Pat. No. 3,142,673.

The aforementioned α-acyloxyalkyl halides, $R_3CO_2CHRCl$—Hal, are synthesized from the corresponding acid halide ($R_3COHal$) and the appropriate aldehyde ($R_1CHO$) according to the methods as taught by Ulich, et al., *J. Am. Chem. Soc.*, 43, 660 (1921) and Euranto, et al., *Acta. Chem. Scand.*, 20, 1,273 (1966). The monoacid chloride of phenylmalonic acid and esters thereof are described in U.S. Pat. No. 3,282,926.

An alternate route leading to the monoester subject compounds of Formula II, scheme D, is exemplified as follows:

Scheme D

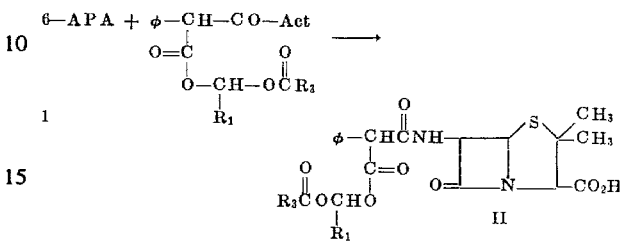

Acylation, using an activated form of an appropriate ester of phenylmalonic acid wherein $R_1$ and $R_3$ are as previously indicated and activation (-Act) can be imparted through a mixed anhydride, p-nitrophenyl ester or, preferably, the acid chloride, on 6-aminopenicillanic acid (1) leads directly to the products of the instant invention.

The aforedescribed reaction is effected by contacting 1 and the requisitely substituted activated ester in equimolar amounts in a water-water immiscible inert solvent at ice bath temperatures. In some instances it is advantageous to employ as much as a 20–40 percent excess of said ester. In practice, a suspension of 1 in the mixed heterogeneous solvent system comprising water and such immiscible solvents as isopropyl ether or benzene is treated with an isopropyl ether solution of the requisite acid chloride while a saturated solution of sodium bicarbonate is added simultaneously at a rate such that the pH is maintained at approximately 5.5–6.5.

Said addition, which requires 10–20 minutes, is followed by an additional stirring period of 20 minutes at ice bath temperatures and 2–5 hours at room temperature. The pH is adjusted to 5.5 and the organic layer separated and dried over sodium sulfate. The solvent can be concentrated in vacuo to provide the free acid or, by employing the appropriate base, salts can be prepared.

The requisite activated phenylmalonic ester employed in the above described reaction can be synthesized by alkylation of the salt of phenylmalonic acid with the appropriate α-acyloxyalkyl halide according to the methods outlines by Wagner and Zook, "Synthetic Organic Chemistry," John Wiley & Sons, Inc., New York, 1956, p. 484, followed by activation as taught in U.S. Pat. No. 3,282,926.

As has been previously noted, a characteristic feature of the acidic compounds of the instant invention of Formulas I and II is their ability to form basic metal salts. Acid congeners of the present invention are converted to basic salts by the interaction of said acid with an appropriate base in an aqueous or non-aqueous medium. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates.

Representative of such bases are ammonia, primary amines such as n-propylamine, n-butylamine, aniline, cyclohexylamine, benzylamine, p-toluidine, ethylamine, octylamine, tertiary amines such as diethylaniline, N-methylpyrrolidine, N-methylmorpholine and 1,5-diazabicyclo-[4,3,0]-5-nonene; sodium hydroxide, potassium hydroxide, ammonium hydroxide, sodium ethoxide, potassium methoxide, magnesium hydroxide, calcium hydride and barium hydroxide.

In a similar manner, treatment of the basic salts with an aqueous acid solution, e.g., mono-, di- or tribasic acid results in the regeneration of the free acid form. Such conversions are best carried out as rapidly as possible and under temperature conditions and method dictated by the stability of said acid products. The acids thus generated can be reconverted to the same or a different basic salt.

In the utilization of the chemotherapeutic activity of those compounds of the present invention which form basic salts, it is preferred, of course, to use pharmaceutically acceptable salts. Although water-insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred are those wherein the cation is ammonium, sodium or potassium.

The novel antibacterial $\alpha$-carboxybenzylpenicillin diesters of formula III are conveniently prepared by alkylation of the disalt of $\alpha$-carboxybenzylpenicillin as follows:

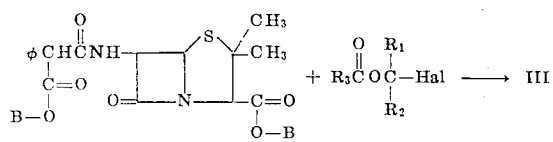

wherein $R_1$, $R_2$, $R_3$, B and Hal are as previously described.

The aforesaid reaction is normally conducted in a reaction-inert solvent such as tetrahydrofuran, dimethylformamide, dimethylsulfoxide or hexamethylphosphoramide. In practice, the $\alpha$-acyloxyalkyl halide is added, preferably dropwise, to a solution or suspension of the salts of the diacid, $\alpha$-carboxybenzylpenicillin. At least two moles of the $\alpha$-acyloxyalkyl halide are added per mole of penicillin, but in certain cases it may be advantageous to employ as much as a 50% excess. The reaction may be carried out at temperatures of from 0°–50° C., with a preferred range of from 20°–30° C. Reaction time will vary according to the temperature employed and the reactivity of the appropriate starting materials. Normally, the reaction period will range anywhere from one to twenty hours.

Upon completion, the desired product is isolated by such standard means as first diluting with a water immiscible solvent such as benzene, ether or ethyl acetate followed by several water washes. Removal of the dried solvent, preferably in vacuo, provides the product, generally in a crude state of purity. Further purification of the desired product is achieved by conventional recrystallization techniques or by chromatographing over acid washed Florisil or deactivated silica gel. In many instances the purified products of this invention are amorphous solids or viscous oils.

The two major starting materials for this reaction, viz the salts of the $\alpha$-carboxybenzylpenicillin and the $\alpha$-acyloxyalkyl halides are either available commercially or may be synthesized readily by those skilled in the art. For instance, disodium $\alpha$-carboxybenzylpenicillin is commercially available, while the procedure for the preparation of the free diacid and other salts, are well known in the chemical prior art as described in U.S. Pat. No. 3,142,673. The aforementioned $\alpha$-acyloxyalkyl halides are readily prepared from common organic reagents by employing standard procedures, e.g., the desired alkyl halides, $R_3CO_2CR_1R_2$—Hal may be synthesized from the corresponding acid chlorides ($R_3COCl$) and aldehydes or ketones ($R_1R_2CO$) in accordance with the general procedures of Ulich, et al., *J. Am. Chem. Soc.*, 43, 660 (1921) and Euranto, et al., *Acta. Chem. Scand.*, 20, 1,273 (1966).

The esters of the present invention are converted by known methods to the corresponding acid, as, for example, by mild acid treatment or enzymatically with an esterase such as liver homogenate.

The valuable products of this invention are remarkably effective in treating a number of susceptible gram-positive and gram-negative infections in animals, including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, for example, intramuscularly or subcutaneously. For parenteral administration they are best used in the form of a sterile nonaqueous solution such as fatty oils of vegetable origin (cotton seed, peanut oil, corn, sesame) and other nonaqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The oral and parenteral dosage levels for the herein described compounds are, in general, on the order of up to 200 mg./kg. and 100 mg./kg. of the body weight per day, respectively.

Many of the penicillin ester compounds of this invention exhibit improved absorption on oral administration over that produced by the corresponding free acid or alkali metal salt forms. They, therefore, represent convenient and effective dosage forms of α-carboxybenzylpenicillin.

Additionally, many of the esters described herein, although inactive or of relatively low activity against gram-negative organisms per se are metabolized to the parent acid, i.e., α-carboxybenzylpenicillin, when injected parenterally into the animal, including the human, body. The rate of metabolic conversion of such esters to the parent acid occurs at such a rate as to provide an effective and prolonged concentration of the parent acid in the animal body. In effect, such esters act as depot sources for the parent acid. Especially useful in this respect are those compounds of Formulas I and II wherein $R_1$ is hydrogen or methyl and $R_3$ is methyl or t-butyl, and Formula III wherein $R_1$ is hydrogen and methyl, $R_2$ is alkyl containing up to six carbon atoms and $R_3$ is alkyl of up to six carbon atoms.

An example of the antimicrobial spectra of one such ester of α-carboxybenzylpenicillin of Formula III against *Staphyloccocus aureus* and *Escherichia coli* is presented below. The tests were run under standardized conditions in which nutrient broth containing various concentrations of the test material was seeded with the particular organism specified, and the minimum concentration (MIC) at which growth of each organism failed to occur was observed and recorded. Benzylpenicillin (K salt) when thus tested gave values of 0.156,>100 vs. *S. aureus* and *E. coli*, respectively.

TABLE I

| $R_1$ | $R_2$ | $R_3$ | *S. aureus* | *E. coli* |
|---|---|---|---|---|
| H | $CH_3$ | $CH_3$ | 0.49 | 100 |
| α-carboxybenzylpenicillin | | | 1.25 | 25 |

Table II presents in vivo data for the same ester in mice (PO = oral and SC = subcutaneous routes of administration). The values are obtained under standardized conditions. The procedure comprises production of an acute experimental *E. coli* 226 infection in mice by the intraperitoneal inoculation of the mice with standardized ($10^{-6}$) *E. coli* 266 culture suspended in 5 percent hog gastric mucin. The test compound is administered in the infected mice by a multiple dosing regimen in which the first dose is given 0.5 hour after inoculation and is repeated 4, 24 and 48 hours later. The percent of mice surviving are then determined.

TABLE II.

In vivo Data vs. *E. coli* 226 in Mice

| $R_1$ | $R_2$ | $R_3$ | Route of Administration | Dose mg./kg. | % Survivors |
|---|---|---|---|---|---|
| H | $CH_3$ | $CH_3$ | PO | 50 | 90 |
| H | $CH_3$ | $CH_3$ | PO | 200 | 100 |
| H | $CH_3$ | $CH_3$ | SC | 50 | 100 |
| H | $CH_3$ | $CH_3$ | SC | 200 | 80 |

The following examples are provided solely for the purpose of illustration and are not to be construed as limitations of this invention, many variations of which are possible without departing from the spirit or scope thereof.

EXAMPLE I

°-Carboxybenzylpenicillin, bis(α-acetoxyethyl)ester

To 25 ml. of dimethylformamide contained in a 100 ml. three necked flask, under a nitrogen atmosphere, is added 5.0 g. (0.0119 mole) of disodium α-carboxybenzylpencillin followed after 30 minutes by the dropwise addition of 2.82 g. (0.0238 mole) of α-chloroethyl acetate. The resulting reaction mixture is allowed to stir at room temperature overnight. 100 milliliters of ethyl acetate is added and the organic phase washed with 6 100 ml. portions of water, The ethyl acetate layer is separated, dried over sodium sulfate and concentrated in vacuo to a thick oil, 3.05 g.

The above crude product is purified by chromatography on 300 ml. of acid washed Florisil. The first fraction, consisting of 250 ml. of eluate, is concentrated in vacuum to provide the product as a viscous oil.

EXAMPLE II

The procedure of Example I is repeated, using the appropriate starting reagents, to provide the following products:

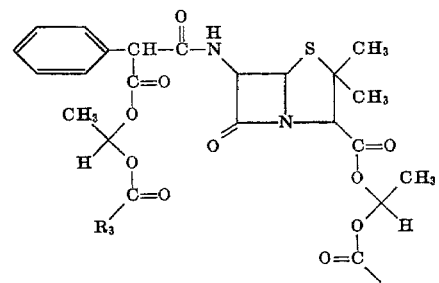

| $R_3$ | $R_3$ |
|---|---|
| —$CH_3$ | —$(CH_2)_2CH(CH_3)_2$ |
| —$C_2H_5$ | —$(CH_2)_5CH_3$ |
| —$CH_2CH_2CH_3$ | —$C(CH_3)_3$ |
| —$(CH_2)_3CH_3$ | —$C(CH_3)_2(CH_2)_2CH_3$ |
| —$(CH_2)_4CH_3$ | —$(CH_2)_3CH(CH_3)_2$ |
| —CHCH$_3$<br>   \|<br>   CH$_3$ | —CHCH(CH$_3$)$_2$<br>   \|<br>   CH$_3$ |
| —CHCH$_2$CH$_3$<br>   \|<br>   CH$_3$ | —CH$_2$CHCH(CH$_3$)$_2$<br>   \|<br>   CH$_3$ |
| —CH$_2$CHCH$_3$<br>   \|<br>   CH$_3$ | —CH(CH$_2$)$_2$CH$_3$<br>   \|<br>   CH$_3$ |

EXAMPLE III

The procedure of Example I is repeated, using the requisite starting materials, to provide the following compounds:

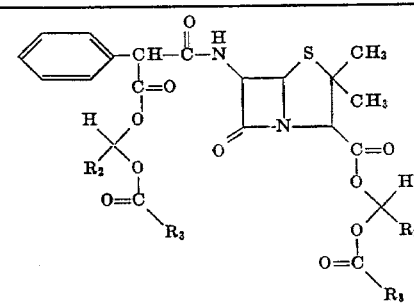

| $R_2$ | $R_3$ |
|---|---|
| —$CH_3$ | —$CH_2CH_2OCH_3$ |
| —$CH_3$ | —$CH_2CH_2OC_2H_5$ |
| —$CH_3$ | —$CH_2CH_2OCHCH_3$<br>　　　　　　$CH_3$ |
| —$CH_3$ | —$CH_2CH_2O(CH_2)_3CH_3$ |
| —$C_2H_5$ | —$CH_2CH_2OCH_3$ |
| —$C_2H_5$ | —$CH_2CH_2SCH_3$ |
| —$CHCH_3$<br>　$CH_3$ | —$CH_2CH_2SC_2H_5$ |
| —$(CH_2)_2CH_3$ | —$(CH_2)_3SCH_3$ |
| —$CH(CH_2)_2CH_3$<br>　$CH_3$ | —$CHCH_2SCHCH_3$<br>　$CH_3$　$CH_3$ |
| —$CH_3$ | —$CH_2CH_2SCH_3$ |
| —$CH_3$ | —$CH_2CH_2S(CH_2)_3CH_3$ |
| —$CH_3$ | —$(CH_2)_4SCH_3$ |
| —$CH(CH_2)_3CH_3$<br>　$CH_3$ | —$(CH_2)_3OCH_3$ |
| —$CHCH_2CH_3$<br>　$C_2H_5$ | —$CHCH_2OC_2H_5$<br>　$CH_3$ |

EXAMPLE IV

The procedure of Example I is repeated, using the appropriately substituted starting materials, to provide the following α-carboxybenzylpenicillin esters:

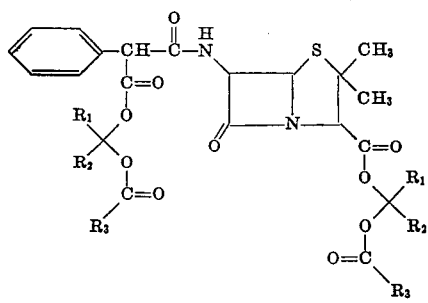

| $R_1$ | $R_2$ | $R_3$ |
|---|---|---|
| $CH_3$— | $CH_3$— | $C_2H_5$— |
| $CH_3$— | $C_2H_5$— | $(CH_3)_2CH$— |
| $CH_3$— | $(CH_3)_2CH$— | $(CH_3)_2CH$— |
| $CH_3$— | $CH_3$— | $CH_3(CH_2)_2$— |
| $CH_3$— | $CH_3(CH_2)_3$— | $CH_3$— |
| $C_2H_5$— | $CH_3$— | $(CH_3)_2CHCH_2$— |
| $CH_3(CH_2)_2$— | $CH_3(CH_2)_3$— | $CH_3$— |
| $CH_3CH_2CH$—<br>　$CH_3$ | $CH_3$— | $(CH_3)_2CH(CH_2)_2$— |
| $(CH_3)_2CHCH_2CH_2$— | $C_2H_5$— | $CH_3$— |
| $CH_3(CH_2)_5$— | $CH_3(CH_2)_2$— | $(CH_3)_3C$— |
| $CH_3CHCH_2CH$—<br>　$CH_3$　$CH_3$ | $CH_3$— | $C_2H_5$ |
|  | $CH_3$ | $CH_3(CH_2)_5$— |

EXAMPLE V

α-Carboxybenzylpenicillin, bis(1-acetoxy-1-cyclohexylethyl)ester

To a suspension of 4.22 g. (0.01 mole) of disodium α-carboxybenzylpenicillin in 30 ml. of dry dimethylformamide is added 4.09 g. (0.02 mole) of 1-chloro-1-cyclohexylethyl acetate. The resulting reaction mixture is allowed to stir at room temperature for 6 hours, after which it is treated with 120 ml. of ethyl acetate, and the ethyl acetate layer washed repeatedly with 150 ml. portions of water. The organic phase is then separated, dried over sodium sulfate and concentrated in vacuo to an oily residue. The desired product is purified by chromatographing the crude material on a column of acid washed Florisil.

EXAMPLE VI

Starting with the appropriate reagents and following the procedure of Example V the following congeners are prepared:

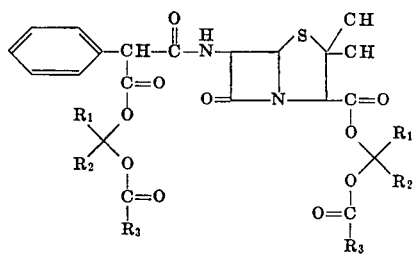

| $R_1$ | $R_2$ | $R_3$ |
|---|---|---|
| cyclopropyl | methyl | cyclopropyl |
| cyclopropyl | ethyl | methyl |
| cyclopropyl | methyl | cyclohexyl |
| cyclobutyl | n-butyl | iso-propyl |
| cyclobutyl | n-propyl | cyclopropyl |
| cyclopentyl | methyl | ethyl |
| cyclopentyl | n-hexyl | methyl |
| cyclohexyl | tert-butyl | cyclopentyl |
| cyclohexyl | methyl | methyl |
| cycloheptyl | ethyl | cyclopentyl |
| 4-methylcyclohexyl | methyl | sec-butyl |
| cyclopropyl | iso-propyl | cyclopropyl |
| cyclooctyl | methyl | methyl |
| cyclooctyl | methyl | cyclopropyl |

EXAMPLE VII

Again using the procedure of Example V and the appropriate starting materials the following products are synthesized:

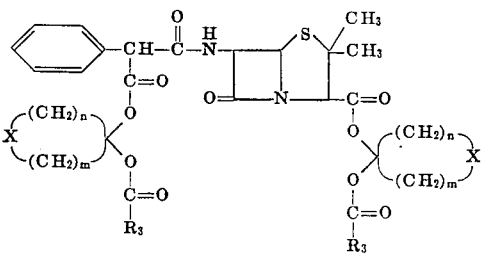

| X | n | m | $R_3$ |
|---|---|---|---|
| $CH_2$ | 1 | 2 | —$CH_3$ |
| $CH_2$ | 2 | 2 | —$CH(CH_3)_2$ |
| $CH_2$ | 2 | 3 | —$C_2H_5$ |
| $CH_2$ | 3 | 3 | —$CHCH_2CH_3$<br>　$CH_3$ |
| O | 1 | 3 | —$(CH_2)_4CH_3$ |
| O | 2 | 2 | —$(CH_2)_2CH_3$ |
| S | 2 | 2 | —$CH(C_2H_5)_2$ |
| S | 3 | 3 | —$C(CH_3)_3$ |
| S | 2 | 3 | —$CH_3$ |
| O | 3 | 2 | —$CH_3$ |

| | | | |
|---|---|---|---|
| CH₂ | 1 | 2 | —(CH₂)₂CH₃ |
| CH₂ | 1 | 2 | C(CH₃)₃ |
| CH₂ | 1 | 1 | (CH₂)₄CH₃ |
| CH₂ | 1 | 1 | CH₂CH(C₂H₅)CH₃ |
| CH₂ | 1 | 3 | CH₃ |
| CH₂ | 1 | 2 | C₂H₅ |

EXAMPLE VIII

To 35 ml. of dry dimethylformamide contained in a 100 ml. three necked flask and maintained under a nitrogen atmosphere is added 8.44 g. (0.02 mole) of disodium α-carboxybenzylpencillin followed, after 20 minutes, by the addition of 5.20 g. (0.04 mole) of 2-chloro-2-phenethyl benzoate. The reaction mixture is allowed to stir at room temperature for 6 hours, after which it is treated with 110 ml. of ethyl acetate. The ethyl acetate layer is washed several times with water, separated and dried. Removal of the solvent, in vacuo, and chromatographing the residue on 300 ml. of acid washed Florisil provides the desired product.

EXAMPLE IX

The procedure of Example VIII is followed, using the appropriate starting materials, to provide the following compounds:

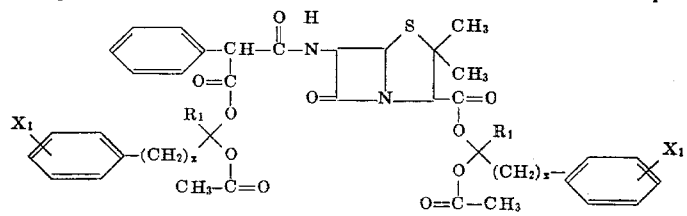

| R₁ | x | X₁ |
|---|---|---|
| H | 1 | 4-CH₃ |
| H | 1 | 3-C₂H₅ |
| H | 2 | 2,4-Cl₂ |
| CH₃ | 1 | 3,4-F₂ |
| CH₃ | 2 | 3-CH₃,4-Cl |
| CH₃ | 3 | 4-OCH₃ |
| C₂H₅ | 1 | 2,4-(OCH₃)₂ |
| C₂H₅ | 3 | 4-SC₂H₅ |
| n-C₃H₇ | 3 | 4Br |
| n-C₃H₇ | 1 | 3-F,4-Cl |
| n-C₃H₇ | 2 | 4-CH₂CH₂CH₃ |
| sec-C₄H₉ | 2 | 2,4-F₂ |
| n-C₆H₁₁ | 2 | 3-OC₂H₅ |

EXAMPLE X

Again, employing the procedure of Example VIII and using the appropriate starting materials, the following esters are synthesized:

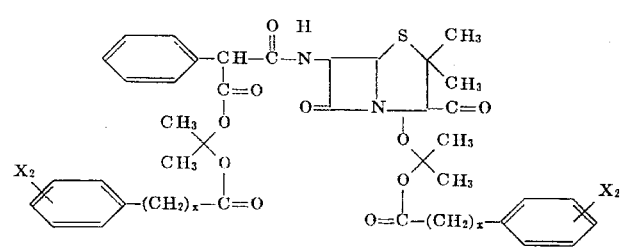

| x | X₂ |
|---|---|
| 0 | 2-CH₃ |
| 0 | 2-C₂H₅ |
| 0 | 3-Cl,4-CH₃ |
| 1 | 4-Cl |
| 1 | 2,4-Cl₂ |
| 1 | 2,4-F₂ |
| 1 | 4-By |
| 1 | 3-CF₃ |
| 2 | 4-CF₃ |
| 2 | 4-Cl |
| 2 | 3,5-(OCH₃)₂ |
| 2 | 2,4-(OCH₃)₂ |
| 2 | 4-SC₂H₅ |
| 2 | 3-NHCOCH₃ |
| 0 | 4-NHCOCH₃ |
| 0 | 4-SO₂N(CH₂CH₂CH₃)₂ |
| 0 | 4-CF₃ |
| 3 | 4-F |
| 3 | 4-SCH₃ |

EXAMPLE XI

The procedure of Example VIII is again repeated, using equivalent amounts of appropriately substituted starting materials, to produce the following compounds:

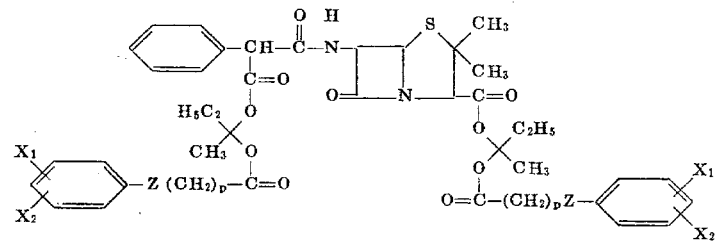

| X₁ | X₂ | Z | P |
|---|---|---|---|
| H | 4-CH₃ | O | 1 |
| H | 4-Cl | O | 1 |
| H | 4-OCH₃ | O | 2 |
| 2-Cl | 4-Cl | O | 1 |
| H | 4-Br | S | 1 |
| 2-Cl | 4-Cl | S | 1 |
| 3-Cl | 5-Cl | O | 2 |
| 2-OCH₃ | 3-OCH₃ | O | 1 |
| 2-F | 4-F | O | 2 |
| H | 4-SCH₃ | S | 1 |
| H | 4-C₂H₅ | O | 2 |
| H | 4-Br | O | 3 |
| 2-Cl | 4Cl | O | 3 |
| 3-CH₃ | 5-CH₃ | S | 2 |
| 3-CH₃ | 4-C₂H₅ | O | 1 |
| H | H | O | 1 |
| H | H | S | 2 |

EXAMPLE XII

α-Carboxybenzylpenicillin, mono(α-acetoxyethyl)ester and N-ethylpiperidine salt

To 35 ml. of dry dimethylformamide contained in a 125 ml. three necked flask, under a nitrogen atmosphere, is added 5.0 g. (0.0119 mole) of disodium α-carboxybenzylpenicillin followed after 10 minutes by the dropwise addition of 1.41 g. (0.0129 mole) of α-chloroethyl acetate. The reaction mixture is allowed to remain at room temperature overnight. Ethyl acetate (100 ml.) is added and the resulting mixture washed with sodium bicarbonate solution. The organic phase is separated and the bicarbonate phase acidified with dilute hydrochloric acid. The acid layer is then extracted with ethyl acetate, washed with water, and the ethyl acetate solution is dried over sodium sulfate and concentrated in vacuo to provide the crude product.

The weighted sample of α-carboxybenzylpenicillin, mono(α-acetoxyethyl)ester is redissolved in ethyl acetate and one equivalent of N-ethylpiperidine is slowly added. The mixture is concentrated in volume under reduced pressure and cooled sufficiently to precipitate the N-ethylpiperidine salt of the desired product.

EXAMPLE XIII

By employing the procedure of Example XII and using equivalent amounts of the requisite starting materials the following mono esters of α-carboxybenzylpenicillin of the formula

and their N-ethylpiperidine salts are prepared:

| $R_1$ | $R_2$ | $R_3$ |
|---|---|---|
| cyclohexyl | hydrogen | cyclopentyl |
| cyclohexyl | methyl | m-fluorobenzyl |
| methylthioethyl | isopropyl | cyclooctyl |
| 2-methoxypropyl | hydrogen | phenoxymethyl methyl |
| —pentamethylene— | | methyl |
| —pentamethylene— | | n-propyl |
| p-methoxybenzyl | methyl | methyl |
| p-methoxybenzyl | hydrogen | ethyl |

EXAMPLE XIV

6-[2-Phenyl-2-carboxyacetamido]penicillanic acid; 3-monopivaloyloxymethyl ester sodium salt (I; $R_1 = H$, $R_3 = t—C_4H_9$)

Scheme A a. 6-aminopenicillanic acid, pivaloyloxymethyl ester (2; $R_1 = H$, $R_3 = t—C_4H_9$)

To a stirred suspension of 10.8 g. (0.05 mole) of 6-aminopenicillanic acid in 50 ml. of dry dimethylformamide at room temperature and under a nitrogen atmosphere is added 9.8 ml. (0.07 mole) of triethylamine, followed after 30 minutes of stirring, by 14.8 ml. (0.1 mole) of chloromethyl pivalate. Stirring is continued for an additional 4 hours, followed by the addition of 150 ml. of ethyl acetate and filtration of the triethylamine hydrochloride. The organic phase is washed (4 × 50 ml.) with water, dried over sodium sulfate and treated with 90 ml. of 0.5M solution of p-toluene-sulfonic acid in ethyl acetate. The resulting salt is filtered and dried at 45° C. under vacuum, 9.2 g., m.p. 150° C. dec.

The free base is generated, as needed, by treatment of the above salt in a mixture of 1:1 ethyl acetate-water with sufficient saturated sodium carbonate solution to provide a pH 8.0, followed by separation of the organic layer, drying and concentration under reduced pressure to an oily residue.

b. 6-[2Phenyl-2-carboxyacetamido]penicilanic acid; 3-monopivaloyloxymethyl ester sodium salt (I; $R_1 = H$, $R_3 = t—C_4H_9$)

A suspension of 33 g. (0.1 mole of 6-aminopenicillanic acid, pivaloyloxymethyl ester in a mixture of 250 ml. of isopropyl ether and 500 ml. of water and cooled in an ice bath is treated with a solution of 19.8 g. (0.1 mole) of phenylmalonic acid, mono acid chloride in isopropyl ether over a period of 15 minutes. The pH of the reaction mixture is maintained at 5.5–6.5 by the simultaneous addition of a saturated solution of sodium bicarbonate. Following the addition, the reaction is stirred for 15 minutes at ice bath temperatures and then for 2 hours at room temperature. The organic layer is separated and the aqueous layer extracted several times with diethyl ether. The ether layers are combined with the isopropyl ether layer, dried and concentrated in vacuo to a white gum, 13.5 g. The pH of the aqueous layer is adjusted to pH 5.3 and repeatedly extracted with diethyl ether followed by drying and concentration to dryness, 18.6 g. The combined semi-solids are dissolved in 30 ml. of diethyl ether and treated with sufficient saturated sodium bicarbonate to provide a pH of 6.4. The aqueous solution is freeze dried to provide the crude sodium salt of the desired product. Dissolution of the sodium salt is methylene chloride followed by filtration of any sodium bicarbonate and evaporation of the methylene chloride solvent provides the purified sodium salt of the product, 14.89 g. (29 percent yield).

| In vitro Activity Data | | |
|---|---|---|
| MIC (mcg./ml.) | S. aureus | E. coli |
| | 12 | 16 |

| In vivo Activity Data | | | | |
|---|---|---|---|---|
| | | % Protected | | |
| | E. coli | | Staph. | |
| Dose, m.g./k.g. | P.O. | S.C. | P.O. | S.C. |
| 200 | 100 | 100 | 90 | 70 |
| 50 | 70 | 60 | 40 | 40 |

EXAMPLE XV

The general procedures of Example XIV are repeated, employing the requisite α-acyloxyalkyl halide, to provide the following analogs:

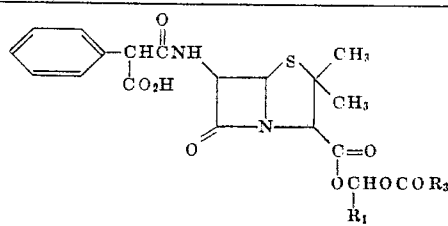

| R₁ | R₃ | R₁ | R₃ |
|---|---|---|---|
| —H | —CH₃ | —C₂H₅ | —CH₃ |
| —H | —C₂H₅ | —C₂H₅ | —C₂H₅ |
| —H | —(CH₂)₂CH₃ | —C₂H₅ | —(CH₂)₄CH₃ |
| —H | —(CH₂)₄CH₃ | —(CH₂)₂CH₃ | —CH₃ |
| —H | —CH₂CH(CH₃)₂ | —(CH₂)₂CH₃ | —(CH₂)₂CH₃ |
| —H | —C(CH₃)₂(CH₂)₂CH₃ | —C₂H₅ | —CH₂CH₂OCH₃ |
| —H | —CH₂CH(CH₃)CH(CH₃)₂ | —C₂H₅ | —CH₂CH₂SCH₃ |
| —H | —CH₂CH₂OCH₃ | —(CH₂)₂CH₃ | —(CH₂)₃SCH₃ |
| —H | —CH₂CH₂SC₂H₅ | —CH(CH₃)(CH₂)₂CH₃ | —CH₃ |
| —H | —CH₂CH₂OCH(CH₃)₂ | —(CH₂)₅CH₃ | —CH₃ |
| —H | —(CH₂)₃SCH₃ | —(CH₂)₅CH₃ | —C₂H₅ |
| —CH₃ | —CH₃ | —(CH₂)₅CH₃ | —(CH₂)₃OC₂H₅ |
| —CH₃ | —(CH₂)₂CH₃ | —H | Cyclo-C₃H₅ |
| —CH₃ | —(CH₂)₄CH₃ | —H | Cyclo-C₅H₉ |
| —CH₃ | —CH(CH₃)C₂H₅ | —H | Cyclo-C₆H₁₁ |
| —CH₃ | —(CH₂)₃CH(CH₃)₂ | —H | Cyclo-C₃H₅ |
| —CH₃ | —CH₂CH₂OCH₃ | —CH₃ | Cyclo-C₆H₁₁ |
| —CH₃ | —CH₂CH₂OCH(CH₃)₂ | —CH₃ | —CH₂CH₂SCH₃ |
| —C₂H₅ | Cyclo-C₃H₅ | —CH₂CH₂OCH₃ | —CH₃ |
| —C₂H₅ | Cyclo-C₈H₁₅ | —CH₂CH₂OCH₃ | —C₂H₅ |
| —(CH₂)₃CH₃ | Cyclo-C₃H₅ | —CH₂CH₂OCH₃ | —(CH₂)₄CH₃ |
| —(CH₂)₅CH₃ | Cyclo-C₃H₅ | —(CH₂)₃OC₂H₅ | —C₂H₅ |
| —(CH₂)₅CH₃ | Cyclo-C₆H₁₁ | —(CH₂)₃OC₂H₅ | —CH(CH₃)₂ |
| Cyclo-C₃H₅ | —CH₃ | —(CH₂)₄SCH₃ | —CH₃ |
| Cyclo-C₃H₅ | —C₂H₅ | —CH₂CH₂SCH(CH₃)₂ | —CH₃ |
| Cyclo-C₆H₁₁ | —CH₃ | —CH₂CH₂SCH(CH₃)₂ | —C₂H₅ |
| Cyclo-C₆H₁₁ | —CH(CH₂)₃ | —CH₂CH₂OCH₃ | —CH₂CH₂OCH₃ |
| Cyclo-C₆H₁₁ | —(CH₂)₄CH₃ | —CH₂CH(CH₃)OC₂H₅ | —CH₂CH₂SCH₃ |
| Cyclo-C₆H₁₁ | —CH₂CH₂OC₂H₅ | —CH₂CH(CH₃)OC₂H₅ | —CH₂CH₂SC₂H₅ |
| Cyclo-C₃H₅ | —CH₂CH₂OC₂H₅ | —(CH₂)₃SCH₃ | —CH₂CH₂SC₂H₅ |
| Cyclo-C₃H₅ | —(CH₂)₃SC₂H₅ | —(CH₂)₃SCH₃ | —CH₂CH₂OCH₃ |
| Cyclo-C₃H₅ | Cyclo-C₃H₅ | —CH₂CH₂SCH₃ | Cyclo-C₃H₅ |
| Cyclo-C₃H₉ | Cyclo-C₃H₅ | —CH₂CH₂SCH₃ | Cyclo-C₃H₅ |
| Cyclo-C₅H₉ | Cyclo-C₆H₁₁ | —CH₂CH(C₂H₅)SCH₃ | Cyclo-C₅H₁₅ |
| Cyclo-C₆H₁₁ | Cyclo-C₈H₁₅ | —CH₂CH₂OC₂H₅ | Cyclo-C₄H₁₁ |
|  |  | —(CH₂)₃OC₂H₅ | Cyclo-C₇H₁₃ |

EXAMPLE XVI

The procedures of Example XIV are repeated, employing the appropriate α-acyloxyalkyl halide, to provide the following congeners:

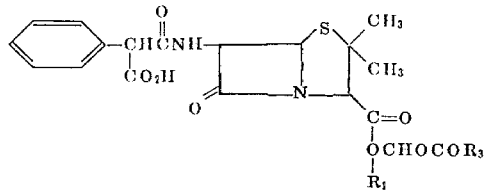

| R₁ | R₃ | R₁ | R₃ |
|---|---|---|---|
| —H | C₂H₅CH₂— | —CH₂CH₂SCH₃ | C₆H₅(CH₂)₃— |
| —H | C₆H₅— | —CH₂CH₂SCH₃ | 4-ClC₆H₄(CH₂)₂— |
| —H | C₆H₅(CH₂)₂— | —CH₂CH₂SCH₃ | 4-FC₆H₄— |
| —H | 4-CH₃OC₆H₄CH₂— | —CH₂CH₂SCH₃ | C₆H₅O(CH₂)₂— |
| —H | 4-ClC₆H₄(CH₂)₂— | —(CH₂)₃SC₂H₅ | C₆H₅O(CH₂)₂— |
| —H | C₆H₅OCH₂— | —(CH₂)₃SC₂H₅ | 3-C₂H₅OC₆H₄CH₂— |
| —H | 4-ClC₆H₄S(CH₂)₃— | Cyclo-C₃H₅ | C₆H₅(CH₂)₃— |
| —CH₃ | C₆H₅CH₂— | Cyclo-C₃H₅ | C₆H₅O(CH₂)₂— |
| —CH₃ | 3-CH₃SC₆H₄— | Cyclo-C₃H₅ | 2,4-Cl₂C₆H₃CH₂— |
| —CH₃ | 2,4-Cl₂C₆H₃— | —H | 3,4-F₂C₆H₃CH₂— |
| —CH₃ | 3-CF₃C₆H₄(CH₂)₂— | —H | 3-Cl-4-CH₃OC₆H₃CH₂— |
| —C₂H₅ | 4-FC₆H₄CH(CH₃)— | —H | 3,4-(CH₂O)₂C₆H₃OCH₂— |
| —C₂H₅ | 4-BrC₆H₄OCH₂— | —CH₃ | 2,4-Br₂C₆H₃S(CH₂)₂— |
| —C₂H₅ | C₆H₅(CH₂)₂— | —CH₃ | C₆H₅— |
| —(CH₂)₃CH₃ | C₆H₅(CH₂)₂— | —CH₃ | 2-Cl-4-BrC₆H₃(CH₂)₃— |
| —(CH₂)₃CH₃ | C₆H₅O(CH₂)₃— | —CH₃ | 4-C₂H₅OC₆H₄— |
| —(CH₂)₃CH₃ | C₆H₅SCH₂— | —CH₃ | 2,4-(C₂H₅O)₂C₆H₂CH₂— |
| —CH₂CH₂OCH₃ | C₆H₅SCH₂— | —CH₂CH₂OCH₃ | 3,4-F₂C₆H₁CH₂— |
| —CH₂CH₂OCH₃ | 2-FC₆H₄CH₂— | —CH₂CH₂SC₂H₅ | 3,4-(CH₂O)₂C₆H₃OCH₂— |
| —CH₂CH₂OCH₃ | 4-CH₃OC₆H₄CH₂— | Cyclo-C₆H₁₁ | 4-n-C₃H₇C₆H₄CH₂— |
| —(CH₂)₃OC₂H₅ | 4-(n-C₄H₉)₂NSO₂C₆H₄— | Cyclo-C₆H₁₁ | 3-CF₃C₆H₄(CH₂)₂— |
| C₆H₅CH₂— | —CH₃ | Cyclo-C₆H₁₁ | 2,4-Cl₂C₆H₄OCH₂— |
| C₆H₅CH₂— | —C₂H₅ | 4-CH₃SC₆H₄CH₂— | Cyclo-C₃H₅ |
| 4-ClC₆H₄CH₂— | —CH(CH₃)₂ | 3,4-(CH₃S)₂C₆H₃CH₂— | Cyclo-C₅H₉ |
| 4-ClC₆H₄CH₂— | —C(CH₃)₃ | 3-Cl-4-FC₆H₃(CH₂)₂— | Cyclo-C₅H₉ |
| 4-CH₃C₆H₄(CH₂)₂— | —CH₃ | 2,4-(CH₃)₂C₆H₃CH₂— | Cyclo-C₅H₉ |
| 2-FC₆H₄CH₂— | —CH₃ | 2-Cl-4-CH₃C₆H₃CH₂— | Cyclo-C₆H₁₁ |
| 3-CH₃OC₆H₄(CH₂)₃— | —C₂H₅ | 4-n-C₃H₇C₆H₄(CH₂)₂— | Cyclo-C₆H₁₁ |
| C₆H₅CH₂— | —(CH₂)₄CH₃ | 3-C₂H₅OC₆H₄CH₂— | Cyclo-C₆H₁₁ |
| C₆H₅CH₂— | —CH(CH₃)CH(CH₃)₂ | 4-C₂H₅SC₆H₄(CH₂)₃— | Cyclo-C₇H₁₃ |
| 2,4-Cl₂C₆H₃CH₂— | —CH₃ | 2,6-Et₂C₆H₃(CH₂)₂— | Cyclo-C₇H₁₃ |
| 3-CH₃SC₆H₄CH₂— | —C₂H₅ | C₆H₅CH₂— | —C₆H₅ |
| 3,4-(CH₃O)₂C₆H₃CH₂— | —(CH₂)₂CH₃ | C₆H₅CH₂— | —(CH₂)₂C₆H₅ |
| 3-Cl-4-FC₆H₃CH₂— | —CH₃ | C₆H₅CH₂— | —(CH₂)₃OC₆H₅ |
| 3-Cl-4-FC₆H₃CH₂— | —CH₂CH₂OCH₃ | C₆H₅CH₂— | —C(CH₂)₃SC₆H₅ |
| C₆H₅(CH₂)₃— | —CH₂CH₂OCH₃ | 4-CH₃OC₆H₄CH₂— | —CH₂C₆H₃—2,4-Cl₂ |
| C₆H₅(CH₂)₃— | —CH₂CH₂O(CH₂)₂CH₃ | 3,4-F₂H₃(CH₂)₂— | —C₆H₅ |
| C₆H₅(CH₂)₃— | —CH₂CH₂SC₂H₅ | 3-Br-4-ClC₆H₃CH₂— | —CH₂OC₆H₅ |
| C₆H₅(CH₂)₃— | —(CH₂)₃SC₂H₅ | 3-Br-4-ClC₆H₃CH₂— | -2,4-Cl₂C₆H₃ |
| 2,5-F₂C₆H₃CH(CH₃)— | —(CH₂)₃SC₂H₅ | 4-i-C₃H₇C₆H₄CH₂— | —C₆H₅ |

EXAMPLE XVII

6-[2-Phenyl-2-carboxyacetamido]penicillanic acid, 3-monoacetoxymethyl ester N-ethylpiperidine salt (I; $R_1 = H$, $R_3 = CH_3$)

Scheme B.

a. 6-Aminopenicillanic acid, acetoxymethyl ester (2; $R_1 = H$, $R_3 = CH_3$)

Starting with 6-aminopenicillanic acid and chloromethyl acetate, and following the procedure of Scheme A-a of Example XIV, the above ester is prepared.

b. α[Carbo (phenoxy) ]benzylpenicillin monoacetoxymethyl ester (3; $R_1 = CH_3$)

A suspension of 28.8 g. (0.1 mole) of 6-aminopenicillanic acid, acetoxymethyl ester in 200 ml. of isopropyl ether, under a nitrogen atmosphere and cooled to 2° C. is treated with 150 ml. of isopropyl ether containing 27.4 g. (0.1 mole) of phenyl phenylmalonyl chloride. The pH of the reaction mixture is maintained at approximately 5.5–6.5 by the simultaneous addition of a saturated sodium bicarbonate solution. Following the completion of the addition, which requires 15–20 minutes, the reaction mixture is allowed to stir at 2° C. and at room temperature for 3 hours. The pH is adjusted to 7 the organic layer separated and the aqueous layer extracted several times with diethyl ether. The ether layers are combined, dried over sodium sulfate and concentrated under reduced pressure to dryness. The crude product is used without further purification.

c. 6-[2-Phenyl-2-carboxyacetamido]penicillanic acid, 3-monoacetoxymethyl ester N-ethylpiperidine salt (I; $R_1 = H$, $R_3 = CH_3$)

To a solution of 5.26 g. (0.01 mole) of α-[Carbo(phenoxy) ]-benzylpenicillin monoacetoxymethyl ester in 100 ml. of acetone is added 100 ml. of a potassium borate buffer providing a solution of pH 9.5. The clear reaction mixture is allowed to stir at room temperature from 4–6 hours followed by removal of the acetone under reduced pressure. The cloudy aqueous solution is extracted with diethyl ether, and the aqueous layer separated and adjusted to pH 5.5 using 6N hydrochloric acid solution. The crude product is extracted into methyl isobutyl ketone to which is added sufficient N-ethylpiperidine to precipitate the salt of the desired product.

EXAMPLE XVIII

6-[2-Phenyl-2-carboxyacetamido]penicillanic acid, 3-mono-α-acetoxyethyl ester sodium salt (I; $R_1 = CH_3$, $R_3 = CH_3$)

Scheme C a. α-[carbo(phenoxy)]benzylpenicillin N-ethylpiperidine salt (4)

A 50 gal. vessel is charged with 8.75 kg. (40.5 moles) of 6-aminopenicillanic acid and 22 gal. of water at 20° C. and the pH of the mixture adjusted from 3.5 to 7.0 with 5 gal. of 10 percent aqueous sodium hydroxide. The electrodes of a Ph meter are immersed in the stirred mixture and the slow addition of 12.92 kg. (47.1 moles) of 2-phenyl-2-(phenoxycarbonyl)acetyl chloride is started. Throughout the addition of acid chloride, which requires one hour, a 10 percent solution of sodium hydroxide is added, as required, to maintain a pH range of 6.2–6.5. The addition of alkali is continued for about 15 minutes after the addition of acid chloride is completed so that a final pH of 6.5 is attained. The resulting oily solution is diluted with 20 gal. of ethyl acetate and the pH adjusted to 2.0 with 6N HCl at 20°C. The layers are separated and the aqueous layer extracted with an additional 5 gal. of ethyl acetate. The organic extracts are combined and dried over anhydrous magnesium sulfate. The ethyl acetate solution is stirred at 20°C. and then 5.04 kg. (44.5 moles) of 1-ethylpiperidine is slowly added. The resulting slurry is stirred for one hour at about 10°C. and then filtered. The cake is washed twice with 2.5 gal. portions of ethyl acetate and then with hexane. Drying in the atmosphere gives 18.6 kg. of the crude product (81 percent of theory), m.p. 140.0–142.5°CC. (dec.).

b. 6-[2-Phenyl-2-carbophenoxyacetamido]penicillanic acid, α-acetoxyethyl ester (3; $R_1 = CH_3$, $R_3 = CH_3$)

To a solution of 5.0 g. (8.8 m moles) of α-[carbo(phenoxy)]-benzylpenicillin N-ethylpiperidine salt in 20 ml. of dry dimethylformamide and under a nitrogen atmosphere is added 1.08 g. (8.8 m moles) of α-chloroethyl acetate and 0.15 g. of potassium iodide, and the resulting reaction mixture allowed to stir 72 hours at room temperature. A 10 ml. aliquot is removed and treated with 20 ml. of chloroform and 25 ml. of water. The organic layer is extracted several additional times with chloroform and the organic extracts combined, washed with water and dried over magnesium sulfate. The residue, remaining after removal of the solvent under vacuum, is dissolved in 20 ml. of ethyl acetate and the resulting solution stirred with an equal volume of water at pH 8.0. The organic layer is subsequently dried and concentrated in vacuo to a light tan foam 883 mg. The crude product which is one spot on thin-layer-chromatography is used directly without further purification.

The second half of the reaction mixture is worked up in exactly the same manner providing similar results.

c. 6-[2-Phenyl-2carboxyacetamido]penicillanic acid, mono-α-acetoxyethyl ester sodium salt (I; $R_1 = CH_3$, $R_3 = CH_3$)

Starting with 3.02 g. (0.01 mole) of α-[carbo(phenoxy) ]benzylpenicillin mono-α-acetoxyethyl ester, and following the hydrolysis procedure of Scheme B-c of Example XVII, the above ester is formed. Replacement of N-ethylpiperidine with sodium 2-ethylhexanoate leads to the preparation of the sodium salt of the desired product.

EXAMPLE XIX

α-[Carbo(acetoxymethyloxy)]benzylpenicillin sodium salt (II; $R_1 = H$, $R_3 = CH_3$)

Scheme D a. Phenylmalonic acid, monoacetoxymethyl ester

To a cooled solution of 18.0 g. (0.1 mole) of phenylmalonic acid in 100 ml. of dry dimethylformamide and under a nitrogen atmosphere is added 10.8 g. (0.2 mole) of sodium methoxide followed immediately by the addition of 10.8 g. (0.1 mole) of chloromethyl acetate. The reaction mixture is allowed to stir in the cold for 1-2 hours after which it is added to ice and water, the pH adjusted to 5.0 with 6N hydrochloric acid solution and the product subsequently extracted into isopropyl ether. The organic layer is washed with water and dried over sodium sulfate. The product is used directly without isolation or further purification.

b. Acetoxymethyl phenylmalonyl chloride

To 125 ml. of isopropyl ether containing approximately 27.7 g. (0.11 mole) of phenylmalonic acid, monoacetoxymethyl ester, prepared above, is added 14.5 ml. (0.1 mole) of thionyl chloride and 2 drops of dimethylformamide and the reaction mixture gently heated to reflux for 15–30 minutes. The reaction mixture is cooled and used directly without isolation or purification of the product.

c. α-[Carbo(acetoxymethyloxy)]benzylpenicillin sodium salt (II; $R_1 = H$, $R_3 = CH_3$)

A partial suspension of 21.6 g. (0.1 mole) of 6-aminopenicillanic acid in 100 ml. of isopropyl ether and cooled in an ice bath is treated with 27.0 g. (0.1 mole) of acetoxymethyl phenylmalonyl chloride in 125 ml. of the same solvent. The pH of the reaction mixture is maintained at approximately 5.5–6.5 by the simultaneous addition of a saturated aqueous solution of sodium bicarbonate. Following the completion of the addition, requiring 20 minutes, the mixture is allowed to stir at room temperature for 3 hours. The pH is adjusted to 5.0 with 6N hydrochloric acid solution and the product extracted with diethyl ether. The ether layer is dried, concentrated to dryness and the residual product dissolved in 75 ml. of dry acetone. Treatment of the acetone solution of the product with a solution of sodium 2-ethylhexanoate in the same solvent results in the formation of the sodium salt of the desired product, which is filtered and dried.

EXAMPLE XX

The general procedures of Example XIV are repeated, employing the requisite starting materials, to provide the following analogs:

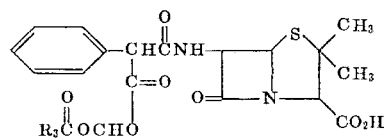

| $R_1$ | $R_3$ | $R_1$ | $R_3$ |
|---|---|---|---|
| —H | —CH₃ | —C₂H₅ | —CH₃ |
| —H | —C₂H₅ | —C₂H₅ | —C₂H₅ |
| —H | —(CH₂)₂CH₃ | —C₂H₅ | —(CH₂)₄CH₃ |
| —H | —(CH₂)₄CH₃ | —(CH₂)₂CH₃ | —(CH₂)₂CH₃ |
| —H | —C(CH₃)₂(CH₂)₂CH₃ | —C₂H₅ | —CH₂CH₂OCH₃ |
| —H | —CH₂CH(CH₃)CH(CH₃)₂ | —C₂H₅ | —CH₂CH₂SCH₃ |
| —H | —CH₂CH₂OCH₃ | —CH(₂)₂CH₃ | —(CH₂)₃SCH₃ |
| —H | —CH₂CH₂SC₂H₅ | —CH(CH₃)(CH₂)₂CH₃ | —CH₃ |
| —H | —CH₂CH₂OCH(CH₃)₂ | —(CH₂)₆CH₃ | —CH₃ |
| —H | —(CH₂)₃SCH₃ | —(CH₂)₅CH₃ | —(CH₂)₃OC₂H₅ |
| —CH₃ | —CH₃ | —H | Cyclo-C₂H₅ |
| —CH₃ | —(CH₂)₂CH₃ | —H | Cyclo-C₅H₉ |
| —CH₃ | —(CH₂)₄CH₃ | —H | Cyclo-C₆H₁₁ |
| —CH₃ | —(CH₂)₃CH(CH₃)₂ | —H | Cyclo-C₃H₅ |
| —CH₃ | —CH₂CH₂OCH₃ | —CH₃ | Cyclo-C₅H₁₁ |
| —CH₃ | —CH₂CH₂OCH(CH₃)₂ | —CH₃ | —CH₂CH₂SCH₃ |
| —C₂H₅ | Cyclo-C₃H₅ | —CH₃ | —CH₃ |
| —C₂H₅ | Cyclo-C₈H₁₅ | —CH₂CH₂OCH₃ | —C₂H₅ |
| —(CH₂)₃CH₃ | Cyclo-C₃H₅ | —CH₂CH₂OCH₃ | —(CH₂)₄CH₃ |
| —(CH₂)₅CH₃ | Cyclo-C₃H₅ | —CH₂CH₂OCH₃ | —C₂H₅ |
| —(CH₂)₅CH₃ | Cyclo-C₆H₁₁ | —(CH₂)₃OC₂H₅ | —CH(CH₃)₂ |
| Cyclo-C₃H₅ | —CH₃ | —(CH₂)₃OC₂H₅ | —CH₃ |
| Cyclo-C₃H₅ | —C₂H₅ | —(CH₂)₄SCH₃ | —CH₃ |
| Cyclo-C₆H₁₁ | —CH₃ | —CH₂CH₂SCH(CH₃)₂ | —C₂H₅ |
| Cyclo-C₆H₁₁ | —CH(CH₃)₂ | —CHCH₂SCH(CH₃)₂ | |
| Cyclo-C₆H₁₁ | —(CH₂)₄CH₃ | —CH₂CH₂OCH₃ | —CH₂CH₂OCH₃ |
| Cyclo-C₆H₁₁ | —CH₂CH₂OC₂H₅ | —CH₂CH(CH₃)OC₂H₅ | —CH₂CH₂SCH₃ |
| Cyclo-C₃H₅ | —CH₂CH₂OCH₂H₅ | —CH₂CH(CH₃)OC₂H₅ | —CH₂CH₂SC₂H₅ |
| Cyclo-C₃H₅ | —(CH₂)₃SC₂H₅ | —(CH₂)₃SCH₃ | —CH₂CH₂SC₂H₅ |
| Cyclo-C₃H₅ | Cyclo-C₃H₅ | —(CH₂)₃SCH₃ | —CH₂CH₂OCH₃ |
| Cyclo-C₃H₅ | Cyclo-C₃H₅ | —CH₂CH₂SCH₃ | Cyclo-C₃H₅ |
| Cyclo-C₃H₉ | Cyclo-C₆H₁₁ | —CH₂CH₂SCH₃ | Cyclo-C₃H₅ |
| Cyclo-C₆H₁₁ | Cyclo-C₈H₁₅ | —CH₂CH(C₂H₅)SCH₃ | Cyclo-C₈H₁₅ |
| | | —CH₂CH₂OC₂H₅ | Cyclo-C₆H₁₁ |
| | | —(CH₂)₃OC₂H₅ | Cyclo-C₇H₁₃ |

EXAMPLE XXI

The procedures of Example XIV are repeated, employing the appropriate α-acyloxyalkyl halide, to provide the following congeners:

| $R_1$ | $R_3$ | $R_1$ | $R_3$ |
|---|---|---|---|
| —H | C₆H₅CH₂— | —CH₂CH₂SCH₃ | C₆H₅(CH₂)₃— |
| —H | C₆H₅— | —CH₂CH₂SCH₃ | 4ClC₆H₄(CH₂)₂— |
| —H | C₆H₅(CH₂)₂— | —CH₂CH₂SCH₃ | 4—FC₆H₄ |
| —H | 4—CH₃OC₆H₄CH₂— | —CH₂CH₂SCH₃ | C₆H₅O(CH₂)₂— |
| —H | 4—ClC₆H₄(CH₂)₂— | —(CH₂)₃SC₂H₅ | C₆H₅O(CH₂)₂— |
| —H | C₆H₅OCH₂— | —(CH₂)₃SC₂H₅ | 3—C₂H₅OC₆H₄CH₂— |
| —H | 4—ClC₆H₄S(CH₂)₃— | Cyclo-C₃H₅ | C₆H₅(CH₂)₃— |
| —CH₃ | C₆H₅CH₂— | Cyclo-C₃H₅ | C₆H₅O(CH₂)₂— |

Table—Continued

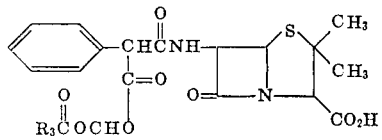

| R₁ | R₃ | R₁ | R₃ |
|---|---|---|---|
| —CH₃ | 3-CH₃SO₄H₄— | Cyclo-C₃H₅ | 2,4-Cl₂C₆H₃CH₂— |
| —CH₃ | 2,4-Cl₂C₆H₃— | —H | 3,4-F₂C₆H₃CH₂— |
| —CH₃ | 3-CF₃C₆H₄(CH₂)₂— | —H | 3-Cl-4-CH₃OC₆H₃CH₂— |
| —C₂H₅ | 4-FC₆H₄CH(CH₃)— | —H | 3,4-(CH₃)₂C₆H₃OCH₂— |
| —C₂H₅ | 4-BrC₆H₄OCH₂— | —CH₃ | 2,4-Br₂C₆H₃S(CH₂)₂— |
| —C₂H₅ | C₆H₅(CH₂)₂— | —CH₃ | C₆H₅— |
| —(CH₂)₃CH₃ | C₆H₅(CH₂)₂— | —CH₃ | 2-Cl-4-BrC₆H₃(CH₂)₃— |
| —(CH₂)₃CH₃ | C₆H₅O(CH₂)₃— | —CH₃ | 4-C₂H₅OC₆H₄— |
| —(CH₂)₃CH₃ | C₆H₅SCH₂— | —CH₃ | 2,4-(C₂H₅O)₂C₆H₃CH₂— |
| —CH₂CH₂OCH₃ | C₆H₅SCH₂— | —CH₂CH₂OCH₃ | 3,4-ₐC₆H₄CH₂— |
| —CH₂CH₂OCH₃ | 2-FC₆H₄CH₂— | —CH₂CH₂SC₂H₅ | 3,4-(CH₃O)₂C₆H₃OCH₂— |
| —CH₂CH₂OCH₃ | 4-CH₃OC₆H₄CH₂— | Cyclo-C₆H₁₁ | 4-n-C₃H₇C₆H₄CH₂— |
| —(CH₂)₃OC₂H₅ | 4-(n-C₄H₉)₂NSO₂C₆H₄— | Cyclo-C₆H₁₁ | 3-CF₃C₆H₄(CH₂)₂— |
| C₆H₅CH₂— | —CH₃ | Cyclo-C₆H₁₁ | 2,4-Cl₂C₆H₄OCH₂— |
| C₆H₅CH₂— | —C₂H₅ | 4-CH₃SC₆H₄CH₂— | Cyclo-C₃H₅ |
| 4-ClC₆H₄CH₂— | —CH(CH₃)₂ | 3,4-(CH₃S)₂C₆H₃CH₂— | Cyclo-C₅H₉ |
| 4-ClC₆H₄CH₂— | —C(CH₃)₃ | 3-Cl-4-FC₆H₃(CH₂)₂— | Cyclo-C₅H₉ |
| 4-CH₃C₆H₄(CH₂)₂— | —CH₃ | 2,4-(CH₃)₂C₆H₃CH₂— | Cyclo-C₅H₉ |
| 2-FC₆H₄CH₂— | —CH₃ | 2-Cl-4-CH₃C₆H₃CH₂— | Cyclo-C₆H₁₁ |
| 3-CH₃OC₆H₄(CH₂)₃— | —C₂H₅ | 4-n-C₃H₇C₆H₄(CH₂)₂— | Cyclo-C₆H₁₁ |
| C₆H₅CH₂— | —(CH₂)₄CH₃ | 3-C₂H₅OC₆H₄CH₂— | Cyclo-C₆H₁₁ |
| C₆H₅CH₂— | —CH(CH₃)CH(CH₃)₂ | 4-C₂H₅SC₆H₄(CH₂)₃— | Cyclo-C₇H₁₃ |
| 2,4-Cl₂C₆H₃CH₂— | —C₂H₅ | 2,6-F₂C₆H₃(CH₂)₂— | Cyclo-C₇H₁₃ |
| 3-CH₃SC₆H₄CH₂— | —C₂H₅ | C₆H₅CH₂— | —C₆H₅ |
| 3,4-(CH₃O)₂C₆H₃CH₂— | —(CH₂)₂CH₃ | C₆H₅CH₂— | —(CH₂)₂C₆H₅ |
| 3-Cl-4-FC₆H₃CH₂— | —CH₃ | C₆H₅CH₂— | —(CH₂)₃OC₆H₅ |
| 3-Cl-4-FC₆H₃CH₂— | —CH₂CH₂OCH₃ | C₆H₅CH₂— | —(CH₂)₂SC₆H₅ |
| C₆H₅(CH₂)₃— | —CH₂CH₂OCH₃ | 4-CH₃OC₆H₄CH₂— | —CH₂C₆H₃-2,4-Cl₂ |
| C₆H₅(CH₂)₃— | —CH₂CH₂O(CH₂)₂CH₃ | 3,4-F₂C₆H₃(CH₂)₃— | —C₆H₅ |
| C₆H₅(CH₂)₃— | —CH₂CH₂SC₂H₅ | 3-Br-4-ClC₆H₃CH₂— | —CH₂OC₆H₅ |
| C₆H₅(CH₂)₃— | —(CH₂)₃SC₂H₅ | 3-Br-4-ClC₆H₃CH₂— | —2,4-Cl₂C₆H₃ |
| 2,5-F₂C₆H₃CH(CH₃)— | —(CH₂)₃SC₂H₅ | 4-i-C₃H₇C₆H₄CH₂— | —C₆H₅ |

EXAMPLE XXII

A tablet base is prepared by blending the following ingredients in the proportion by weight indicated.

| | |
|---|---|
| Sucrose, U.S.P. | 80.0 |
| Tapioca starch | 12.5 |
| Magnesium stearate | 7.5 |

Sufficient α-carboxybenzylpenicillin, bis (α-acetoxy-i-propyl)ester is blended into the base to provide tablets containing 25, 100 and 250 mg. of active ingredient.

EXAMPLE XXIII

Capsules containing 25, 100, and 250 mg. of active ingredient are prepared by blending sufficient α-carboxybenzylpenicillin, bis(α-acetoxyethyl)ester in the following mixture (proportions given in parts by weight.)

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE XXIV

A suspension of α-carboxybenzylpenicillin, bis (α-acetoxyethyl)ester is prepared with the following composition:

| | |
|---|---|
| Penicillin compound | 31.42 g. |
| 70% Aqueous Sorbitol | 714.29 g. |
| Glycerine, U.S.P. | 185.35 g. |
| Gum acacia (10% solution) | 100.00 ml. |
| Polyvinyl pyrrolidone | 0.5 g. |
| Propyl parahydroxybenzoate | 0.172 g. |
| Distilled water to make one liter | 0.094 g. |

Various sweetening and flavoring agents may be added to this suspension, as well as acceptable coloring. The suspension contains approximately 25 mg. of penicillin compound per milliliter.

EXAMPLE XXV

A parenteral form of α-carboxybenzylpenicillin bis (α-acetoxyethyl)-ester is prepared by dissolving an intimate mixture of the penicillin compound and sodium citrate (4 percent by weight) in sufficient polyethylene glycol 200 such that the final concentration of the penicillin compound is 25 mg. of active ingredient per milliliter. The resulting solution is sterilized by filtration and sterilely stoppered in vials.

EXAMPLE XXVI

In a manner similar to Example XXIII, capsules containing 25, 100 and 250 mg. of 6-[2-phenyl-2-carboxyacetamido]penicillanic acid, 3-mono-α-acetoxyethyl ester sodium salt are prepared.

What is claimed is: formulae:

1. A compound selected from the group consisting of monoesters of α-carboxybenzylpenicillin having the formulas:

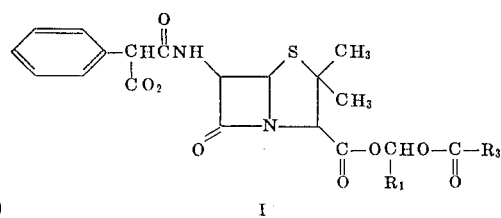

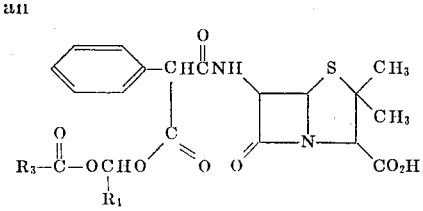

and the pharmaceutically acceptable salts thereof, wherein:

R₁ is selected from the group consisting of:
1. hydrogen,
2. alkyl, alkoxyalkyl and alkylthioalkyl each containing up to six carbon atoms,
3. cycloaklyl of from three to six carbon atoms, and
4. phenylalkyl and mono- and disubstituted phenylalkyl wherein said substituent is selected from the group consisting of alkyl containing up to three carbon atoms, chlorine, bromine, fluorine and alkoxy and alkylthio each containing up to two carbon atoms; and R₃ is selected from the group consisting of:
1. alkyl of up to six carbon atoms,
2. cycloalkyl of from three to eight carbon atoms,
3. phenyl, phenylalkyl and mono- and disubstituted phenyl and phenylalkyl wherein said alkyl portion consists of one to three carbon atoms and said substituents are each chosen from the group consisting of chlorine, bromine, fluorine, alkoxy and alkylthio each having up to two carbon atoms, trifluoromethyl and N,N-di-(n-propyl)-sulfamyl,
4. phenylheteroalkyl and substituted phenylheteroalkyl of the formula;

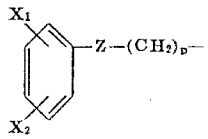

wherein the substituents X₁ and X₂, are each chosen from the group consisting of hydrogen, chlorine, bromine, fluorine, alkyl containing up to three carbon atoms and alkoxy and alkylthio each having up to two carbon atoms, Z is selected from the group consisting of O and S and $p$ is an integer of from 1 to 3.

2. A compound of claim 1, formula I, wherein R₁ is hydrogen and R₃ is alkyl containing up to six carbon atoms.

3. 6[2-Phenyl-2-carboxyacetamido]penicillanic acid, 3-monoacetoxymethyl ester.

4. 6-[2-Phenyl-2-carboxyacetamido]penicillanic acid, 3-monopivaloyloxymethyl ester.

5. A compound of claim 1, Formula I, wherein R₁ is methyl and R₃ is alkyl containing up to six carbon atoms.

6. 6-[2-Phenyl-2-carboxyacetamido]penicillanic acid, 3-mono-α-acetoxyethyl ester.

7. A compound of claim 1, formula II, wherein R₁ is hydrogen and R₃ is alkyl containing up to six carbon atoms.

8. α-[Carbo(acetoxymethyloxy)]benzylpenicillin.

9. α-[Carbo(pivaloyloxymethyloxy)]benzylpenicillin.

10. A compound of claim 1, formula II, wherein R₁ is methyl and R₃ is alkyl containing up to six carbon atoms 11. α-[Carbo(α'-acetoxyethyloxy]benzylpenicillin.

* * * * *